United States Patent
Vitella et al.

(10) Patent No.: US 8,124,292 B2
(45) Date of Patent: Feb. 28, 2012

(54) FUEL CELL STACKS AND METHODS

(75) Inventors: Thomas Vitella, Franklin, MA (US); Jeff Baldic, Milford, MA (US); Ronald Rezac, Bolton, MA (US); Nick Lauder, Newton, MA (US); Seth Avis, Chestnut Hill, MA (US); Paul Osenar, Southborough, MA (US)

(73) Assignee: Protonex Technology Corporation, Southborough, MA (US)

( * ) Notice: Subject to any disclaimer, the term of this patent is extended or adjusted under 35 U.S.C. 154(b) by 597 days.

(21) Appl. No.: 11/823,743

(22) Filed: Jun. 28, 2007

(65) Prior Publication Data

US 2009/0004519 A1    Jan. 1, 2009

(51) Int. Cl.
*H01M 2/38* (2006.01)
*H01M 2/40* (2006.01)

(52) U.S. Cl. ......... 429/457; 429/452; 429/456; 429/518

(58) Field of Classification Search ............... 429/26, 429/457, 518
See application file for complete search history.

(56) References Cited

U.S. PATENT DOCUMENTS

| | | | |
|---|---|---|---|
| 4,212,929 A | 7/1980 | Grevstad et al. | |
| 4,397,917 A | 8/1983 | Chi et al. | |
| 4,476,197 A | 10/1984 | Herceg | |
| 5,162,167 A * | 11/1992 | Minh et al. | 429/456 |
| 5,176,966 A | 1/1993 | Epp et al. | |
| 5,514,487 A | 5/1996 | Washington et al. | |
| 5,750,281 A | 5/1998 | Washington et al. | |
| 5,976,727 A * | 11/1999 | Mercuri et al. | 429/37 |
| 6,080,503 A | 6/2000 | Schmid et al. | |
| 6,596,427 B1 | 7/2003 | Wozniczka et al. | |
| 6,689,504 B1 | 2/2004 | Matsumoto et al. | |
| 6,887,610 B2 * | 5/2005 | Elhamid et al. | 429/35 |

(Continued)

FOREIGN PATENT DOCUMENTS

WO    WO-96/20509    7/1996
(Continued)

OTHER PUBLICATIONS

International Search Report and Written Opinion for PCT/US2008/068383, dated Sep. 11, 2008.

(Continued)

*Primary Examiner* — Ula C Ruddock
*Assistant Examiner* — Patricia Davis
(74) *Attorney, Agent, or Firm* — Edwards Wildman Palmer LLP; Christine C. O'Day; George N. Chaclas (57) ABSTRACT

The invention provides a fuel cell stack including a layer of encapsulating material disposed about the separator plate, MEA, and reactant manifold, wherein the reactant manifold is bounded at least in part by the encapsulating material. The fuel cell stack also includes a first opening through the plate body to the first face from the second face, and an open channel in the second face extending from the opening toward a periphery of the plate. The invention also provides a fuel cell stack having a first face including an opening for passage of a reactant therethrough, a first reactant flow field defined thereon, and a first raised surface formed thereon substantially surrounding the opening. The first raised surface is configured and adapted to mate with a second surface on a face of an adjacent plate to create a flow obstruction for encapsulating material.

20 Claims, 7 Drawing Sheets

U.S. PATENT DOCUMENTS

| | | |
|---|---|---|
| 6,946,210 B2 | 9/2005 | Osenar et al. |
| 7,052,796 B2 | 5/2006 | Sabin et al. |
| 2002/0039675 A1 | 4/2002 | Braun et al. |
| 2003/0096153 A1 | 5/2003 | Osenar et al. |
| 2004/0195724 A1 | 10/2004 | Yoshida et al. |
| 2004/0247982 A1* | 12/2004 | Sabin et al. ............ 429/35 |
| 2005/0244703 A1 | 11/2005 | Osenar et al. |
| 2005/0260482 A1* | 11/2005 | Frank et al. ............ 429/38 |
| 2006/0057436 A1 | 3/2006 | Osenar et al. |
| 2006/0127735 A1 | 6/2006 | Sabin et al. |
| 2007/0218341 A1* | 9/2007 | Kushibiki et al. ........ 429/38 |

FOREIGN PATENT DOCUMENTS

| | | |
|---|---|---|
| WO | WO-02/43173 | 5/2002 |
| WO | WO-03/036747 | 5/2003 |
| WO | WO-03/092096 | 11/2003 |
| WO | WO-2004/027896 | 1/2004 |
| WO | WO-2004/047210 | 6/2004 |

OTHER PUBLICATIONS

International Search Report and Written Opinion for PCT/US07/08954, dated Feb. 8, 2008.

* cited by examiner

FUEL CELL STACKS AND METHODS

BACKGROUND OF THE INVENTION

1. Field of the Invention

The present invention relates to a fuel cell stack for generating electrical energy. Particularly, the present invention is directed to a fuel cell stack including a layer of encapsulating material.

2. Description of Related Art

Membrane based electrochemical cells, and particularly, proton exchange membrane (PEM) fuel cells are well known. PEM fuel cells convert chemical energy to electrical power with virtually no environmental emissions and differ from a battery in that energy is not stored, but derived from supplied fuel. Therefore, a fuel cell is not tied to a charge/discharge cycle and can maintain a specific power output as long as fuel is continuously supplied. Significant funds have been invested in fuel cell research and commercialization, indicating that the technology has considerable potential in the marketplace. However, the high cost of fuel cells as compared to conventional power generation technology deters their widespread use. The cost of fabricating and assembling fuel cells can be significant due to the materials and labor involved. Indeed, as much as 85% of a fuel cell's cost can be attributed to manufacturing.

In general, a single cell PEM fuel cell consists of an anode and a cathode compartment separated by a thin, ionically conducting membrane. This catalyzed membrane, with or without gas diffusion layers, is often referred to as a membrane electrode assembly (MEA). Energy conversion begins when the reactants, reductants and oxidants, are supplied to the anode and cathode compartments, respectively, of the PEM fuel cell. Oxidants include pure oxygen, oxygen-containing gases, such as air, and halogens, such as chlorine. Reductants, also referred to herein as fuel, include hydrogen, natural gas, methane, ethane, propane, butane, formaldehyde, methanol, ethanol, alcohol blends and other hydrogen rich organics. At the anode, the reductant is oxidized to produce protons, which migrate across the membrane to the cathode. At the cathode, the protons react with the oxidant. The overall electrochemical redox (reduction/oxidation) reaction is spontaneous, and energy is released. Throughout this reaction, the PEM serves to prevent the reductant and oxidant from mixing and to allow ionic transport to occur.

Current state of the art fuel cell designs comprise more than a single cell, and in fact, generally combine several MEAs, flow fields and separator plates in a series to form a fuel cell "stack"; thereby providing higher voltages and the significant power outputs needed for most commercial applications. Flow fields allow for the distribution of reactants through the fuel cell and are typically separate from the porous electrode layers within the fuel cell. Depending on stack configuration, one or more separator plates may be utilized as part of the stack design to prevent mixing of the fuel, oxidant and cooling streams within the fuel cell stack. Such separator plates can also provide structural support to the stack.

Bipolar plates perform the same function as an oxidant flow field, fuel flow field and separator plate in combination and are often used in the design of fuel cells as their use can reduce the number of components required in the functioning fuel cell. These bipolar plates contain an array of channels formed in the surface of the plate contacting an MEA, which function as the flow fields. The lands conduct current from the electrodes while the channels between the lands serve to distribute the reactants utilized by the fuel cell and facilitate removal of reaction by-products, such as water. Fuel is distributed from the fuel inlet port to the fuel outlet port, as directed by the channels, on one face of the bipolar plate, while oxidant is distributed from the oxidant inlet port to the oxidant outlet port, as directed by the channels, on the opposing face of the bipolar plate, and the two faces are not connected through the plate. The particular design of the bipolar plate flow field channels may be optimized for the operational parameters of the fuel cell stack, such as temperature, power output, gas humidification and flow rate. Ideal bipolar plates for use in fuel cell stacks are thin, lightweight, durable, highly conductive, corrosion resistant structures such as carbon/polymer composites or graphite. In the fuel cell stack, each bipolar plate serves to distribute fuel to one MEA of the stack through its fuel flow field face while distributing oxidant to a second MEA through the opposite oxidant flow field face. A thin sheet of porous paper, cloth or felt, usually made from graphite or carbon, may be positioned between each of the flow fields and the catalyzed faces of the MEA to support the MEA where it confronts grooves in the flow field to conduct current to the adjacent lands, and to aid in distributing reactants to the MEA. This thin sheet is normally termed a gas diffusion layer (GDL) and can be incorporated as part of the MEA.

Of necessity, certain stack components, such as the GDL portion of the MEA, are porous in order to provide for the distribution of reactants and byproducts into, out of, and within the fuel cell stack. Due to the porosity of elements within the stack, a means to prevent leakage of any liquid or gases between stack components (or outside of the stack) as well as to prevent drying out of the various stack elements due to exposure to the environment is also needed. To this end, gaskets or other seals are usually provided between the surfaces of the MEA or PEM and other stack components and on portions of the stack periphery. These sealing means, whether composed of elastomeric or adhesive materials, are generally placed upon, fitted, formed or directly applied to the particular surfaces being sealed. These processes are labor intensive and not conducive to high volume manufacturing, thereby adding to the high cost of fuel cells. Additionally, the variability of these processes results in poor manufacturing yield and poor device reliability.

Fuel cell stacks may also contain humidification channels within one or more of the coolant flow fields. These humidification channels provide a mechanism to humidify fuel and oxidants at a temperature as close as possible to the operating temperature of the fuel cell. This helps to prevent dehydration of the PEM as a high temperature differential between the gases entering the fuel cell and the temperature of the PEM causes water vapor to be transferred from the PEM to the fuel and oxidant streams.

Fuel cell stacks range in design depending upon power output, cooling, and other technical requirements, but may utilize a multitude of MEAs, seals, flow fields and separator plates, in intricate assemblies that result in manufacturing difficulties and further increased fuel cell costs. These multitudes of individual components are typically assembled into one sole complex unit. The fuel cell stack is formed by compressing the unit, generally through the use of end plates and bolts, although banding or other methods may be used, such that the gaskets seal and the stack components are held tightly together to maintain electrical contact there between. These conventional means of applying compression add even more components and complexity to the stack and pose additional sealing requirements.

Various attempts have been made in the fuel cell art to address these deficiencies in fuel cell stack assembly design and thereby lower manufacturing costs. However, most stack assembly designs still require manual alignment of the components, active placement of the sealing means and/or a multi-step process, each of which presents notable disadvantages in practice. See, e.g., the processes described in U.S. Pat. No. 6,080,503, to Schmid et al., U.S. Pat. No. 4,397,917, to Chi et al., and U.S. Pat. No. 5,176,966, to Epp et al.

Additionally, in traditional fuel cell cassettes, two types of MEAs dominate; MEAs in which 1) the membrane extends beyond the borders of the gas diffusion layers, and 2) gasket materials are formed into the edges of the MEA itself with the membrane and GDLs approximately of the same size and shape (see, e.g., U.S. Pat. No. 6,423,439 to Ballard). In the first type, separate gaskets are used to seal between the membrane edge extending beyond the GDL and the other part of the stack (bipolar plates). In the second type, the gasket of the MEA seals directly to the other parts of the stack. Each of these methods requires compression to make a seal. These compressive-based seals require that all the components in the stack have high precision such that a uniform load is maintained. MEA suppliers have become accustomed to supplying the MEA formats above.

Various conventional stacks for use in fuel cells and other electrochemical applications utilize an internal manifold design with compression-based seals. However, there are notable drawbacks associated with that architecture. For instance, using a conventionally-sealed, internally manifolded stack there is a significant area that is sacrificed in sealing around the MEA and internal manifolds. One solution is to locate some or all of the manifolds external to the stack. However, other difficulties are observed in many stacks with external manifold designs, such as difficulty sealing between the manifold and the stack. As in traditional stacks, sealing is typically accomplished with gaskets and compression. Unfortunately, gasket/compression based seals have a number of inherent drawbacks, including a sensitivity to thermal cycling, requirements of uniform compression and associated hardware, high tolerance parts, and delicate assembly requirements.

Still other attempts have been made to improve upon fuel cell design and performance. For instance, U.S. Pat. No. 4,212,929 describes an improved sealing method for fuel cell stacks. That patent reports a sealing system that utilizes a polymer seal frame clamped between the manifold and the stack. As described, the seal frame moves with the stack and the leak rate associated with a typical manifold seal is reduced during compression. U.S. Pat. No. 5,514,487 and U.S. Pat. No. 5,750,281 both describe an edge manifold assembly that comprises a number of manifold plates. The plates are mounted on opposite sides of the fuel cell stack and function in such a way to selectively direct the reactant and coolant streams along the perimeter of the stack. While these designs offer limited improvements to other conventional assemblies, they are generally unsuitable for high-volume manufacture.

Recognizing these and other deficiencies in the art, the Assignee of this application has developed a series of innovative methods for sealing manifold ports within the stack or a module thereof, as well as methods for sealing the stack or module periphery that are less labor intensive and more suitable to high-volume manufacturing processes (see World Publication WO 03/036747). That publication discloses a 'one-shot' assembly of fuel cell stacks (and other electrochemical devices) in which all of the component parts are assembled into a mold without gaskets. A resin is introduced into the mold and this resin selectively penetrates certain portions of the assembly either by resin transfer molding or injection molding techniques. Upon hardening, that resin seals the components and defines all the manifold channels within the stack. The net effect is to replace the gaskets of the traditional stack with adhesive based seals, introduced after the assembly of the components.

In another previous patent application, the Assignee of this application reported on an innovative fuel cell stack design which assembles together individual modules to form a fuel cell stack of requisite power output where each module permanently binds a number of unit cells together (see World Publication WO 02/43173).

The assignee also has previously described fuel cells having an MEA in which the GDL and membrane were more or less of the same general outline as each other and of the overall stack profile (see World Publication WO 03/092096). A major advantage of that technique is the ability to directly use a roll-to-roll MEA without having to do any post processing. However, a substantial portion of the cross-section of each MEA is used for sealing the various manifold openings and periphery of the stack such that only about 50% of the cell cross section is available for the electrochemical reaction.

The assignee also has developed membrane-based electrochemical cells, and more particularly, PEM fuel cell stacks that comprise one or more composite MEAs having a molded gasket about the periphery. The gasket portion of the composite MEA has one or more features capable of regulating the flow of sealant during sealing processes (see World Publication 2004/047210).

Despite these advancements over the prior the art, the Assignee of this application has recognized that further improvements can be made to the technology. The present invention, as embodied herein, presents such improvements.

SUMMARY OF THE INVENTION

The purpose and advantages of the present invention are set forth in and will become apparent from the description that follows. Additional advantages of the invention will be realized and attained by the methods and systems particularly articulated in the written description and claims hereof, as well as from the appended drawings.

To achieve these and other advantages and in accordance with the purpose of the invention, as embodied herein, the invention includes a fuel cell stack. The fuel cell stack includes at least one bipolar plate assembly including a first generally planar plate body having a first generally planar face. The first face includes an opening defined by the first plate body for passage of a reactant therethrough, a first reactant flow field defined thereon, and a first raised surface on the first face substantially surrounding the opening. The first raised surface is adapted and configured to mate with a second surface on a face of an adjacent bipolar plate assembly, wherein the first raised surface and second surface create a flow obstruction for the encapsulating material when the raised surfaces are mated or positioned in close proximity. A first membrane electrode assembly is in operable communication with the first reactant flow field. A reactant manifold is in fluid communication with the reactant flow field by way of a first fluid flow path. The reactant manifold is adapted and configured to facilitate transport of a reactant through the fuel cell stack. A layer of encapsulating material is disposed about the separator plate, membrane electrode assembly and reactant manifold. The encapsulating material is substantially prevented from flowing into the opening defined by the first plate body by the flow obstruction.

In accordance with a further aspect of the invention, the flow obstruction between the plates is adapted and configured to retain electrical isolation between the two components and may permit a gas flow therethrough prior to encapsulating material being incorporated into the stack. The flow obstruction can be adapted and configured to substantially prohibit a gas flow therethrough prior to encapsulating material being incorporated into the stack. The flow obstruction can include an o-ring surrounding the opening.

In accordance with another aspect of the invention, the first raised surface includes material that is an electrical insulator, and which may contact the next plate to effect the flow obstruction for the encapsulating material. The first raised surface can be composed of a material different from the first plate body and second plate body. The first raised surface can constitute a monolithic structure in combination with the first plate body. The first raised surface can be generally ring shaped. The first raised surface can fully surround the opening. It is also possible for the first raised surface to include at least one interruption therein along its extent.

In accordance with still another aspect of the invention, a second raised surface is provided substantially surrounding the opening. The second raised surface can substantially surround the first raised surface.

The invention also includes a method for making a fuel cell stack. The method includes providing a first fuel cell separator plate body having a first generally planar face. The first plate body defines a first opening for passage of a reactant therethrough. A first reactant flow field is defined on the first face, and a first raised surface is on the first face substantially surrounding the first opening. The method further includes disposing a first side of a first membrane electrode assembly in communication with the first reactant flow field. The method includes disposing a second fuel cell separator plate body having a second generally planar face in communication with a second side of the membrane electrode assembly to form a stack. The second face includes a second opening defined by the second plate body for passage of a reactant therethrough. The second face also defines a second reactant flow field thereon. A receiving surface is on the second face substantially surrounding the opening. The first raised surface and receiving surface interfit to define a flow obstruction. The method also includes encapsulating the stack in an encapsulating material. The encapsulating material is substantially prevented from flowing into the opening defined by the first plate body by the flow obstruction.

The invention further includes a fuel cell stack including a bipolar plate assembly having a first generally planar plate body that includes a first generally planar face defining a first reactant flow field. The plate body also has a second generally planar face defining a first opening through the plate body to the first face and a first open channel in the second planar face extending from the opening toward a periphery of the plate. The first flow field, first opening and first open channel define a first fluid flow path. The fuel cell stack further includes a first membrane electrode assembly having a first face in operable communication with the first reactant flow field. A reactant manifold is in fluid communication with the reactant flow field by way of the first fluid flow path. The reactant manifold is adapted and configured to facilitate transport of a reactant through the fuel cell stack. A layer of encapsulating material is disposed about the separator plate, membrane electrode assembly and reactant manifold. The reactant manifold is bounded at least in part by the encapsulating material.

In accordance with another aspect of the invention, the bipolar plate assembly further includes a second generally planar plate body having a third generally planar face and a fourth generally planar face in intimate contact with the second face. The third generally planar face can define a second reactant flow field. The fourth generally planar face can define a second opening through the second plate and a second open channel in the fourth planar face extending from the opening toward a periphery of the second plate, wherein the second flow field, second opening and second open channel further cooperate to define a second fluid flow path.

A second membrane electrode assembly having a first face in operable communication with the second reactant flow field can be included. The second and fourth faces can cooperate to define a coolant flow field within the separator plate including a channel extending from the coolant flow field toward the periphery of the plate. The second and forth faces can cooperate to define at least one of: a reactant flow passage extending from a reactant flow field on an external surface of the bipolar plate assembly toward a periphery of the bipolar plate assembly, and a coolant flow passage extending from a coolant flow field inside the bipolar plate assembly toward a periphery of the bipolar plate assembly. At least one of the flow passages can terminate at an edge of the bipolar plate assembly at a port, the port having a perimeter defined by the second and fourth faces. A concavity for receiving a plenum mold insert can be defined by the edge of the plate proximate the port.

The first plate body and second plate body can be an integral structure joined together at the second planar face and fourth planar face. The first plate body and second plate bodies can be joined by a conductive adhesive seal. The conductive adhesive seal can be formed from a material selected from the group including, for example, a resin material that is chemically compatible with material of the first plate body and second plate body, or an adhesive material, among others.

In accordance with a further aspect of the invention, the second planar face defines a sealant channel therein that substantially surrounds the first opening and the first open channel. The sealant channel can include first and second ends proximate a periphery of the first plate body. Encapsulating material can be disposed in the sealing channel. Encapsulating material disposed in the sealing channel preferably substantially fluidly isolates the reactant channel and the coolant channel from other fluid sources in the stack.

The invention also includes a method for making a fuel cell stack. The method includes providing a bipolar plate assembly comprising a first generally planar plate body having a first generally planar face defining a first reactant flow field and a second generally planar face defining a first opening through the plate to the first face. A first open channel in the second planar face extends from the opening toward a periphery of the plate. The first flow field, first opening and first open channel define a first fluid flow path. The method also includes positioning a first membrane electrode assembly in operable communication with the first reactant flow field and encapsulating the separator plate and membrane electrode assembly in a layer of encapsulating material. A reactant manifold is defined at least in part by the encapsulating material. The reactant manifold is adapted and configured to facilitate transport of a reactant through the fuel cell stack.

It is to be understood that both the foregoing general description and the following detailed description are exemplary and are intended to provide further explanation of the invention claimed.

The accompanying drawings, which are incorporated in and constitute part of this specification, are included to illustrate and provide a further understanding of the method and system of the invention. Together with the description, the drawings serve to explain the principles of the invention.

DETAILED DESCRIPTION

Reference will now be made in detail to the present preferred embodiments of the invention, examples of which are illustrated in the accompanying drawings. The method and corresponding steps of the invention will be described in conjunction with the detailed description of the system.

The devices and methods presented herein may be used for improving the manufacturability and application of fuel cells. The present invention is particularly suited for lowering the required tolerances, simplifying of fuel cell components, such as reactant and coolant manifolds and minimizing labor requirements.

In accordance with a first embodiment of the invention, a fuel cell stack is provided including at least one bipolar plate assembly that has a first generally planar plate body with a first generally planar face. The first face includes an opening defined by the first plate body for passage of a reactant therethrough. A first reactant flow field is defined on the first face, and a first raised surface on the first face substantially surrounds the opening. The first raised surface is adapted and configured to mate with a second surface on a face of an adjacent bipolar plate assembly, wherein the first raised surface and second surface create a flow obstruction when the raised surfaces are mated. A first membrane electrode assembly is in operable communication with the first reactant flow field. A reactant manifold is in fluid communication with the reactant flow field by way of a first fluid flow path. The reactant manifold is adapted and configured to facilitate transport of a reactant through the fuel cell stack. A layer of encapsulating material is disposed about the separator plate, membrane electrode assembly and reactant manifold. The encapsulating material is substantially prevented from flowing into the opening defined by the first plate body by the flow obstruction.

Figure 1:
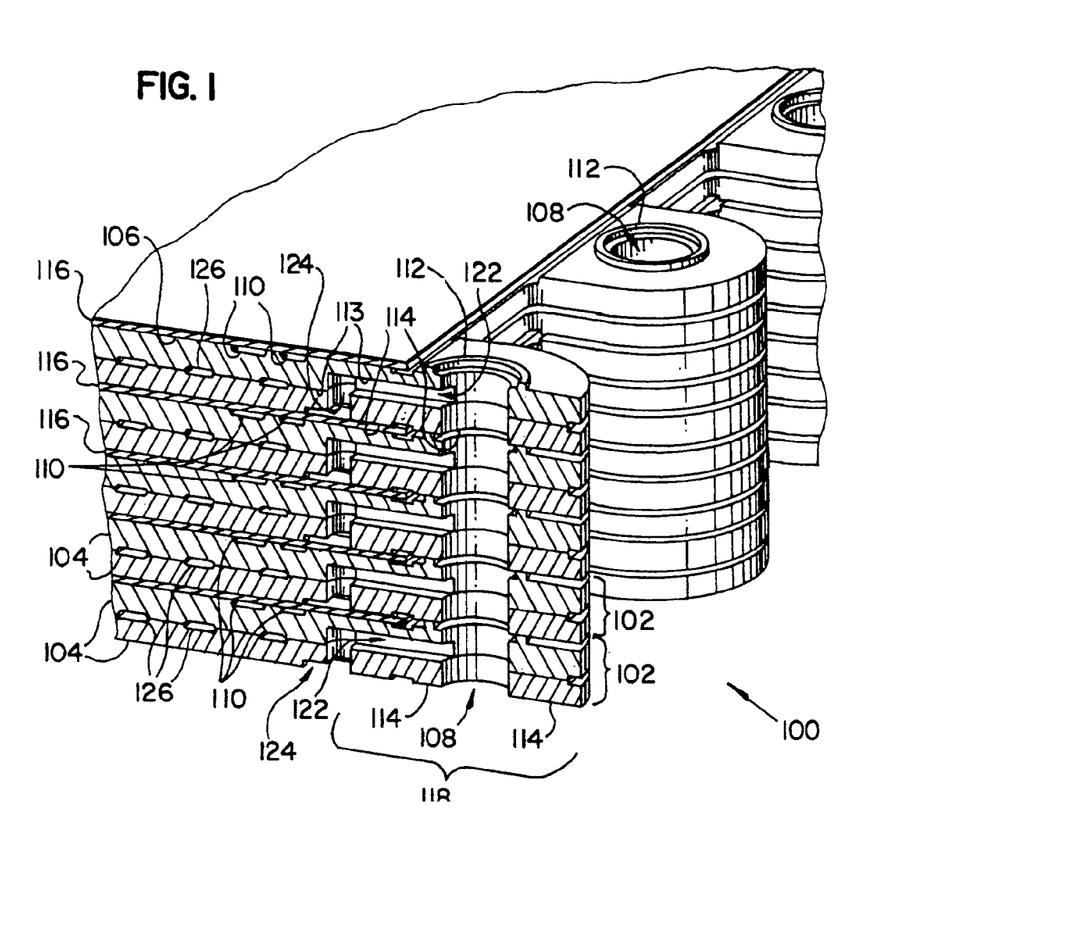
FIG. 1 is a partially cut-away perspective view of a portion of a first representative embodiment of a bipolar plate assembly and stack made in accordance with the present invention, showing separator plates having raised surfaces surrounding the openings.

For purpose of explanation and illustration, and not limitation, a partial view of an exemplary embodiment of the fuel cell stack in accordance with the invention is shown in FIG. 1 and is designated generally by reference character 100. Other embodiments of a fuel cell stack in accordance with this embodiment of the invention, or aspects thereof, are provided in FIGS. 2-6, as will be described.

In accordance with the invention, at least one bipolar plate assembly 102 is provided having a first generally planar plate body 104. FIG. 1 shows five bipolar plate assemblies 102, including ten individual plate bodies 104, stacked together to make a portion of fuel cell stack 100. Each plate body 104 has a first generally planar face 106. An opening 108 is defined in each plate body 104. Opening 108 is shown as a circular hole in plate body 104, however, any suitable shape can be used for the opening. Openings 108 are designed so that a reactant, such as fuel or an oxidant, can be supplied to the fuel cell stack 100 therethrough.

Each plate body 104 has a reactant flow field, such as fuel flow field 110 or oxidant flow field 124, defined on one side. The other side may optionally define a coolant flow field 126 therein so that when two plate bodies 104 are arranged back to back, they may combine to enclose the coolant flow field 126 between them. Two plate bodies 104 arranged together in this manner comprise a bipolar plate assembly 102. As shown in FIG. 1, bipolar plate assembly 102 has a fuel flow field 110 defined on the top face 106, an oxidant flow field 124 defined on the bottom face 114, and a coolant flow field 126 running throughout the middle of the bipolar plate assembly 102.

As will be appreciated by those of skill in the art, the term separator plate, as described herein, refers to a variety of different types of plates that may be found in a fuel cell stack. For example, separator plates may include bipolar plates in the middle of a fuel cell stack as well as terminal plates located proximate end plates of the stack.

As further depicted in FIG. 1, a raised surface 112 is defined on the first face 106 of each plate body 104 disposed about opening 108. As depicted, raised surface 112 completely surrounds each opening 108, however it is also possible for raised surface 112 to substantially surround opening 108 without completely surrounding it, in accordance with the invention. For example, raised surface 112 may comprise an interrupted surface or otherwise not completely surround opening 108. Raised surface 112 is preferably designed to mate or align with a second surface 114 of an adjacent fuel cell bipolar plate assembly 102, as shown in FIG. 1. When mated, raised surface 112 and second surface 114 cooperate to form a flow obstruction. The flow obstruction functions to prevent encapsulating material from freely flowing into opening 108 during the encapsulation process, as described below.

A variety of different configurations can be used as flow obstructions. As depicted in FIG. 1, raised surfaces 112 are simply ring shaped features surrounding openings 108. Raised surfaces 112 are preferably made of a nonconductive material that is different from the conductive material of the rest of assembly 102, and are affixed to assembly 102 prior to assembly of the stack to reduce part count. In other words, since adjacent bipolar plate assemblies 102 should not be in electrical contact with one another, the material of raised surfaces 112 should provide electrical insulation between adjacent assemblies 102. By way of further example, if desired, a non-conductive coating may be used to maintain isolation. It is also possible to use insulative O-rings in lieu of raised features 112, such as O-rings 212 shown in FIGS. 2, 3, and 6. O-rings 212 can be used create a seal around openings 208 and between adjacent separator plates 202, if desired. Preferably, the material of raised surfaces 112/212 is compatible with the encapsulation material (described below) to allow for an adhesive seal between adjacent bipolar plate assemblies 102/202. Raised surfaces 112 can be made from a hard compound or a compressible material without departing from the spirit and scope of the invention. Moreover, raised surface 112 can be a precision-made washer used as a discrete component, or a more conventional washer precisely located and molded into the plate 104 during plate manufacture.

Figure 4:
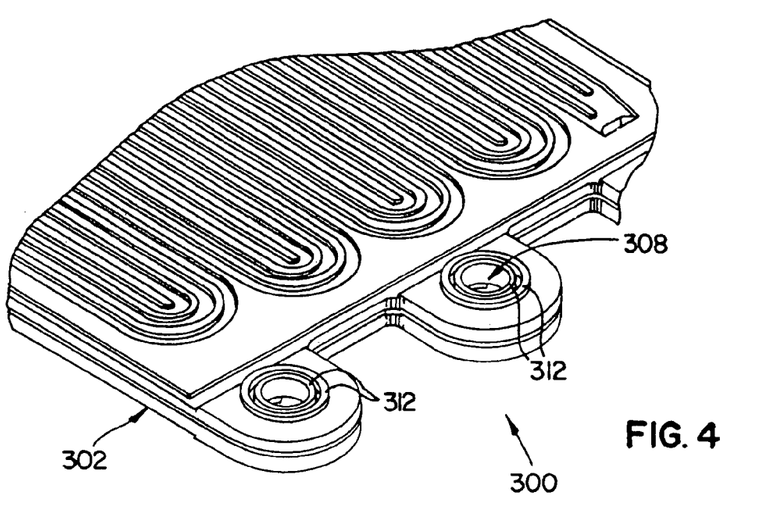
FIG. 4 is a partial perspective view of a portion of a third representative embodiment of a bipolar plate assembly made in accordance with the present invention, showing raised surfaces surrounding the openings on the separator plate, wherein one ring-shaped raised surface surrounds another ring-shaped raised surface, which surrounds the opening.
Figure 5:
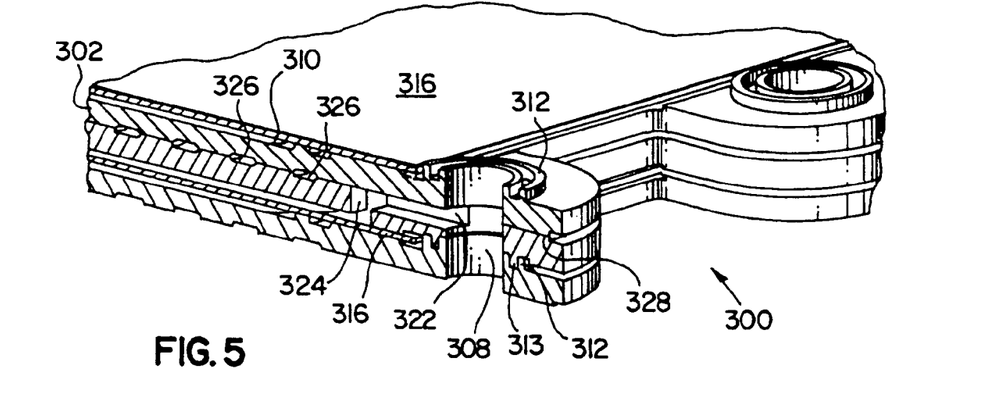
FIG. 5 is a partial cut-away perspective view of a fuel cell stack using a separator plate as depicted in FIG. 4, showing the cross section of the raised surfaces defining a tortuous sealant flow path.

Another example of a flow obstruction in accordance with the invention is shown in FIGS. 4 and 5. Raised feature 312 is formed monolithically with plate 302, which simplifies assembly. Raised feature 312 actually includes two raised ring-shaped features, one surrounding the other. However, it is also possible for one or both of the raised ring-shaped features to have an interruption, as long as feature 312 substantially surrounds opening 308. Moreover, it is also possible to use similar features having any suitable shape besides ring-shaped, in accordance with the invention.

A complementary raised feature 313 is formed opposite to raised feature 312 on plate 302. Raised features 312 and 313 of adjacent plates 302 cooperate to create a flow obstruction around opening 308. Since it is undesirable for adjacent plates 302 to be in electrical contact, features 312 and 313 of adjacent plates are preferably made from nonconductive material or have a nonconductive coating disposed thereon. In accordance with another embodiment, the tolerances of features 312, 313 may be configured to maintain a gap between the structures to prevent electrical contact. Encapsulating material later incorporated into the stack may then pass between features 312, 313. During the encapsulation process (described below), the encapsulating material is restricted from freely flowing into opening 308 by the combination of features 312 and 313.

For purposes of illustration and not limitation, as embodied herein and as depicted in FIG. 1, fuel cell stack 100 is further provided with a membrane electrode assembly 116 (hereinafter "MEA" 116). Stack 100 includes an MEA 116 sandwiched between each set of bipolar plate assemblies 102. In a fully assembled cell stack 100, each operational MEA 116 is in fluid contact with an oxidant flow field 124 on one side, and a fuel flow field 110 on its other side. When in operation, oxidant and fuel flow past opposite sides of MEA 116 to produce electrical power as known in the art. Those skilled in the art will readily appreciate that there are numerous suitable materials and configurations for the MEA 116.

In further accordance with the invention, a manifold 118 is provided in fluid communication with each reactant flow field 110, 124, as well as coolant flow field 126. Manifold 118 generally includes openings 108, which when stacked generally define a plenum, as best seen in the cross-section portion of FIG. 1. Each fuel cell bipolar plate assembly 102 includes one or more passages from plenums 108 to a reactant flow field 110, 124 or coolant flow field 126. The passage is defined by a channel 122 in second surface 113 of one plate body 104, and the mating face 113 of the adjoined plate body 104 in a separator plate 102. Channel 122 allows fluid to flow from the cylinder defined by the plenum of openings 108 into or out of oxidant flow field 124 (or fuel flow field 110 on the side opposite that shown in FIG. 1). Similar channels 122 communicate between openings 108 and coolant flow field 126. It is also possible to define channel 122 in each of reciprocally mating faces 113, as in channel 222 shown in FIG. 2.

Figure 2:
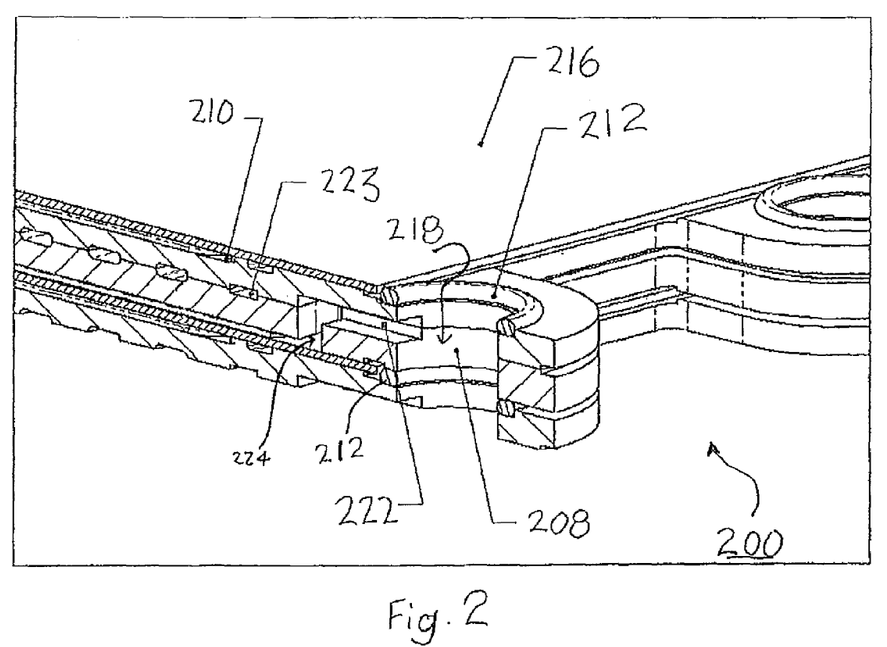
FIG. 2 is a partially cut-away perspective view of a portion of a second representative embodiment of a bipolar plate assembly and stack made in accordance with the invention, showing separator plates having raised surfaces surrounding the openings in the form of o-rings.
Figure 3:
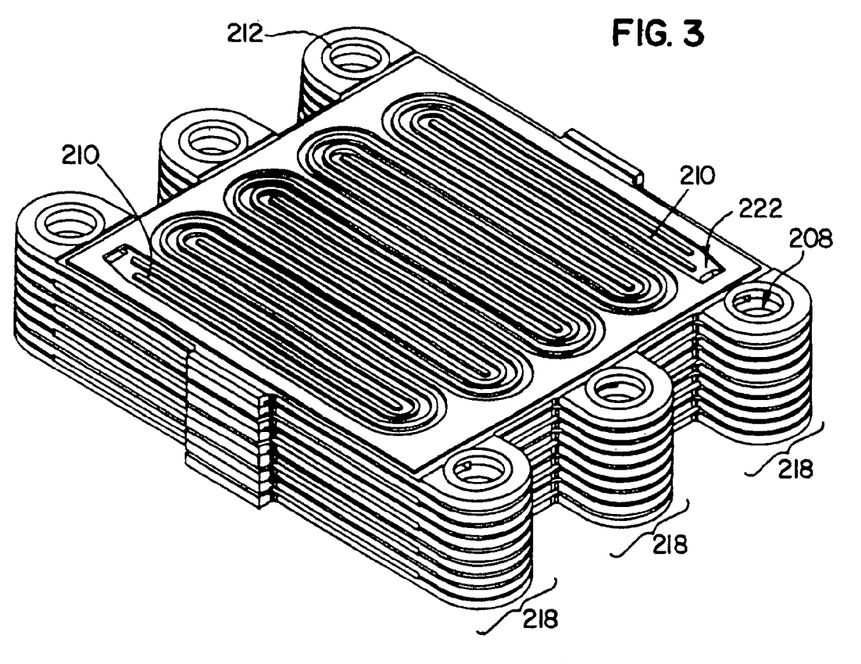
FIG. 3 is a perspective view of the fuel cell stack of FIG. 2, showing multiple separator plates stacked together.

As shown in FIGS. 1-3, each reactant flow field (e.g. 110, 224, 210) flows generally from an opening 108, 208 of a fuel cell bipolar plate assembly 102, 202 to exit at another opening 108, 208 through a path designed to maximize the reactions on MEA 116. However, those skilled in the art will readily appreciate that a path of any suitable shape can be used in accordance with the invention. In this configuration, manifolds 118, 218 allow fuel, oxidant, and coolant to be transported through the fuel cell stack to generate electrical power. Each flow field (fuel, oxidant, and coolant) has a manifold 118, 218 for incoming fluid and a manifold 118, 218 on the opposite side for outgoing fluid, for a total of six manifolds 118, 218. However, those skilled in the art will readily appreciate that other configurations/numbers of manifolds can be used without departing from the spirit and scope of the invention.

Figure 6:
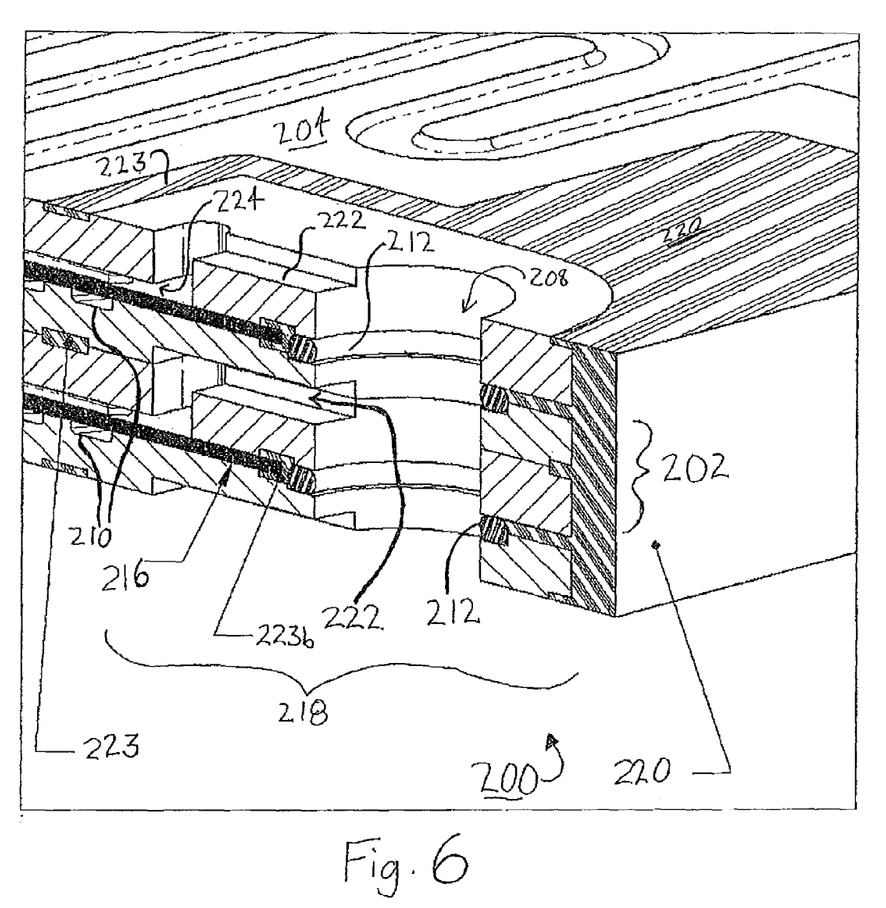
FIG. 6 is a partial cut-away perspective view of a portion of the fuel cell stack of FIG. 2, showing an encapsulating material disposed around the manifold portion of the stack.

For purposes of illustration and not limitation, as embodied herein, system 100 includes a layer of encapsulating material disposed about the separator plate (not shown in FIG. 1). FIG. 6 shows a layer of encapsulating material 220 encasing manifold 218 of a stack 200. During the process of infusing encapsulating material 220 into the periphery of fuel cell stack 200, the flow obstruction (e.g. 112, 212, 312) acts to prevent encapsulating material 220 from freely flowing into opening 108, 208, 308. Thereby each plenum defined by a stack of openings (e.g. 108) is kept free from excess encapsulation material 220, which could otherwise form obstructions within the plenum/manifold to the detriment of the efficiency of the fuel cell stack 100, 200, 300. The flow obstructions 112, 212, 312 ultimately prevent encapsulating material 220 from flowing into channels 122, 222, 322, which could otherwise block the channels and prevent proper operation of the fuel cell stack.

To encapsulate the fuel cell stack (e.g., 200), a resin may be introduced around the periphery, or within injection holes of all assembled components. A vacuum is then pulled through an end plate of the stack through each of the manifold holes within the assembly. The pressure differential introduces resin into the edges of the assembly thereby encapsulating all the edges of the components in the assembly together and forming the assembly into a fuel cell stack as described in U.S. Pat. No. 6,946,210, which is incorporated by reference herein in its entirety. Alternately, the pressure differential may be created by applying pressure to the encapsulant instead of applying vacuum to the fuel cell stack assembly. In addition, the same pressure differential introduces the resin into the spaces, if any, defined between a raised feature (e.g., 112) on a first plate and the surface of an adjacent separator plate.

The pressure differential and time required to accomplish the sealing process is a function of the materials used in the fuel cell cassette construction. These include, for example, the viscosity and flow characteristics of the resin, and the type of gas diffusion layer used in the MEA. Those skilled in the art will be able to judge the appropriate time and pressure based on these parameters. Those practicing the invention may also ascertain the most appropriate time and pressure by visual inspection during the sealing process with the use of transparent molds through which the resin progress can be seen in the topmost layer of the assembly.

A variety of suitable encapsulating materials 220 can be used in accordance with the invention. Preferably, a resin material that is compatible with raised features 112, 212, 312 is used to form an adhesive seal therewith. Those skilled in the art will appreciate that any suitable encapsulation material can be used without departing from the spirit and scope of the invention. The resin or sealant used for encapsulation is selected such that it has the required chemical and mechanical properties for the conditions found in an operating fuel cell system (oxidative stability, for example). Appropriate resins/sealants include both thermoplastics and thermoset elastomers. Preferred thermoplastics include thermoplastic olefin elastomers, thermoplastic, polyurethanes, plastomers, polypropylene, polyethylene, polytetrafluoroethylene, fluorinated polypropylene and polystyrene. Preferred thermoset elastomers include epoxy resins, urethanes, silicones, fluorosilicones, and vinyl esters.

As further shown in FIG. 6, encapsulation channels 223 are be formed in the top and bottom surfaces of a plate body 204, which surround opening 208 and other portions of manifold 218 to effectively seal against fuel and oxidant deviating from the intended flow path in manifold 218 into fields 210, 224. A portion 223b of channels 223 isolates the edge of MEA 216 proximate to o-ring 212. As also shown in FIG. 6, O-rings 212 may partially or completely block encapsulating material 220 from flowing into opening 208.

As will be appreciated, it is not necessary for a flow obstruction in accordance with the invention to completely block encapsulating material from entering the opening. It is sufficient that the flow obstruction inhibit the flow of encapsulating material into the manifold to an extent that leaves the manifold substantially free of obstructions. For example, in FIG. 5, a small gap in the form of a tortuous flow path is shown between raised feature 312 and the raised mating feature 313. It is possible for a fluid (especially a gas) to communicate across the tortuous path of the flow obstruction between features 312 and 313. However, if the viscosity of the encapsulating material is sufficient and/or the material is caused to cure as it approaches opening 108, there will not be a significant flow of encapsulating material through the flow obstruction 312, 313.

It is even possible that a small amount of encapsulating material could fill the tortuous gap and even protrude into the manifold. This would create a small bump or ridge on the generally cylindrical plenum wall defined by openings 308, however the efficiency of fuel cell stack 300 would not be significantly affected thereby as long as encapsulating material does not substantially obstruct channels 322, for example. Having encapsulating material fill the gap between features 312 and 313 can actually be favorable in creating the needed seal inside manifold 318, as well as to help electrically insulating adjacent plates 302 from each other.

As will be appreciated by those skilled in the art, the encapsulating material may be hardened, either by cooling of a thermoplastic resin or curing in the case of a thermoset resin. The encapsulating material can be cured, partially cured, or thickened to help ensure the effectiveness of the flow obstructing geometry in preventing excessive travel of the material into the manifolds as described herein. Several methods can be utilized to accomplish this. For example, a heated gas may be passed through the manifold during molding. By way of further example, the separator plates of the stack may be preheated in the manifold areas, for example, by way of heated inserts which may be removed or left in place during molding.

With reference to FIGS. 4 and 5, aside from features 312 and 313, fuel cell stack 300 is generally similar to stacks 100 and 200 described above, in that fuel cell stack 300 includes separator plates 302, each of which encloses a coolant flow field 326 at a plate- to plate-interface 328. MEA 316 is arranged between adjacent plates 302, thus being in contact with fuel flow field 310 on one side and oxidant flow field 324 on the opposite side. Openings 308 communicate with fuel and oxidant flow fields 310, 324 as well as coolant flow field 326, through channels 322.

In accordance with another aspect of the invention, a method for making a fuel cell stack is provided. The method includes providing a bipolar plate assembly including two plate bodies, wherein a first separator plate body includes a first generally planar face. A first opening is defined by the first plate body for passage of a reactant therethrough. The first face has a first reactant flow field defined thereon. A first raised surface is disposed or formed on the first face, substantially surrounding the first opening. The method further includes disposing a first side of a first MEA in communication with the first reactant flow field. The method also includes disposing a second fuel cell separator plate body having a second generally planar face in communication with a second side of the MEA to form a stack. The second face includes a second opening defined by the second plate body for passage of a reactant therethrough. A second reactant flow field is defined on the second face. A receiving surface is disposed or formed on the second face substantially surrounding the opening. The first raised surface and receiving surface interfit to define a flow obstruction. The method also includes encapsulating the stack about its periphery using an encapsulating material, wherein the encapsulating material is substantially prevented from flowing into the opening defined by the first plate body by the flow obstruction.

For purposes of illustration and not limitation, as embodied herein and as depicted in FIGS. 1-6, a first fuel cell separator plate body of a first bipolar plate assembly having a generally planar face is provided (e.g. plate body 104). A first opening (e.g. 108, 208, 308) is defined in the first plate body. A reactant flow field (e.g. fuel flow field 110, 210, 310) is defined on the first face of the plate body. Also, a first raised surface (e.g. 112, 212, 312) is disposed or formed on the first face. The first raised surface substantially surrounds the first opening. The flow field, opening, and raised surface can all be formed in the provided plate body by processes well known in the art.

In further accordance with the invention, the method includes the additional step of disposing a first side of a first MEA (e.g. 116, 216, 316) in communication with the first reactant flow field, as described above. Suitable MEA materials and configurations will be readily apparent to those skilled in the art.

In further accordance with the method of the invention, the method also includes disposing a second fuel cell separator plate body (e.g. 104) having a second generally planar face in communication with a second side of the MEA. The second plate body defines a second opening (e.g. 108, 208, 308) for passage of a reactant therethrough. A second reactant flow field (e.g. 124, 224, 324) is defined on the second face. A receiving surface is disposed or formed on the second face substantially surrounding the opening. The first raised surface and receiving surface interfit to define a flow obstruction, as described above in conjunction with stacks 100, 200, and 300.

The method in accordance with the invention also includes encapsulating the stack about its periphery using an encapsulating material (e.g. 220), as shown for example in FIG. 6. By way of example and not limitation, the stack (e.g. 100, 200, 300) can be placed in a mold and resin can be infused into the mold by known techniques to encapsulate the stack. The encapsulating material is substantially prevented from flowing into the opening defined by the first plate body by the flow obstruction, as described above with reference to stacks 100, 200, and 300. It is possible, for example, to move encapsulating material in to seal the flow obstruction by applying a vacuum to the plenum formed by the openings (e.g. 108) and/or by applying pressure to the resin. As will be appreciated, the method in accordance with the invention can include any other suitable step for making the fuel cell stacks described above.

The method and fuel cell stacks described above in conjunction with FIGS. 1-6 provide several advantages over the state of the art in fuel cell manufacturing. Since the manifold features are provided within the separator plates, there is no need for manufacturing complex external manifolds. Moreover, due to the use of encapsulating material, which seals the manifold and encases the stack, tolerances (e.g. surface finish, geometric tolerances, allowable draft angle, allowable edge radii, etc.) on the individual plates can be relaxed somewhat. Also, less post-machining is required. Therefore, manufacturing fuel cell stacks in accordance with the present invention is a simpler and less expensive alternative to conventional stack manufacturing methods.

In further accordance with the invention, a fuel cell stack is provided including a bipolar plate assembly having a first generally planar fuel cell separator plate body. The first generally planar plate body has a first generally planar face that defines a first reactant flow field. A second generally planar face defines a first opening through the plate body to the first face and a first open channel in the second planar face extending from the opening toward a periphery of the plate. The first flow field, first opening, and first open channel define a first fluid flow path. The fuel cell stack further includes a first MEA having a first face in operable communication with the first reactant flow field. A reactant manifold is in fluid communication with the reactant flow field by way of the first fluid flow path. The reactant manifold is adapted and configured to facilitate transport of a reactant through the fuel cell stack. A layer of encapsulating material is disposed about the separator plate, MEA, and reactant manifold. The reactant manifold is bounded at least in part by the encapsulating material.

For purpose of explanation and illustration, and not limitation, views of an exemplary embodiment of the fuel cell stack made in accordance with this aspect of the invention are depicted in FIGS. 7-10.

Figure 7:
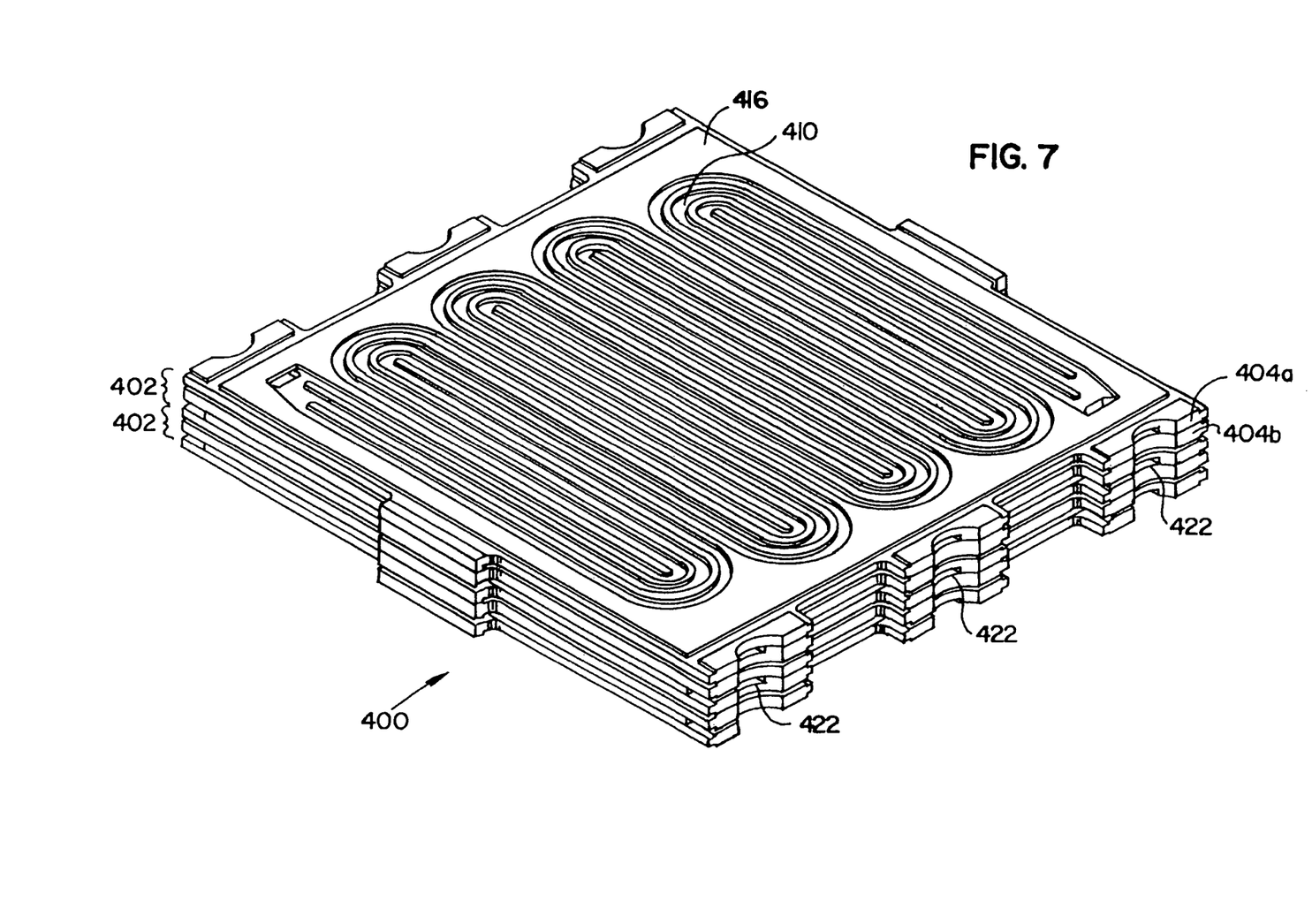
FIG. 7 is a perspective view of a fourth representative embodiment of a stack of bipolar plate assemblies made in accordance with the present invention, showing openings into the reactant and coolant flow fields on either side of a separator plate.

In accordance with the invention, and with reference now to FIG. 7, a bipolar plate assembly 402 is provided including a first generally planar plate body 404a. A second generally planer plate body 404b is also shown in FIG. 4. This second plate body may be integrally joined back to back with plate body 404a. Plate bodies 404a, 404b are preferably joined together with a conductive, adhesive seal formed therebetween. Appropriate sealing materials include resin materials that are chemically compatible with the materials of plate bodies 404a,b, and other suitable adhesive materials known in the art. Such materials may also be used to seal together the plate bodies of the embodiment of FIGS. 1-6. Each plate body 404 has a first generally planar face defining a first reactant flow field 410, which is similar to the flow fields (e.g. 110) described above with reference to fuel cell stacks 100, 200, and 300.

Figure 8:
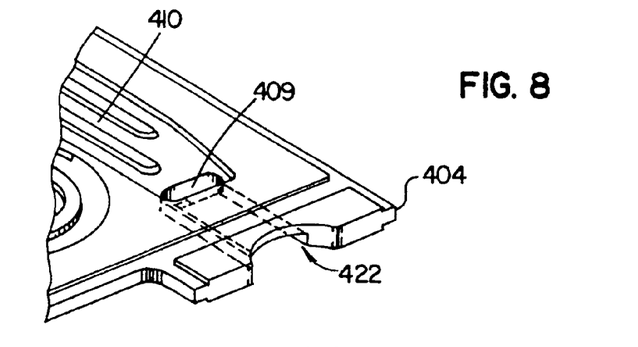
FIG. 8 is a perspective view of a portion of the bipolar plate assembly of FIG. 7, showing in detail the opening, including an open channel, into the reactant flow field on a separator plate.

In further accordance with the invention, and as shown in FIG. 8, each plate body 404 includes a second generally planar face that defines a first opening 409 through the plate body 404. Opening 409 communicates from the second face to the flow field 410 defined in the first face. A first open channel 422 extends from opening 409 to the edge of plate body 404. Thus, there is a flow path starting from the edge of plate body 404, through first channel 422 and opening 409, and into flow field 410.

Figure 9:
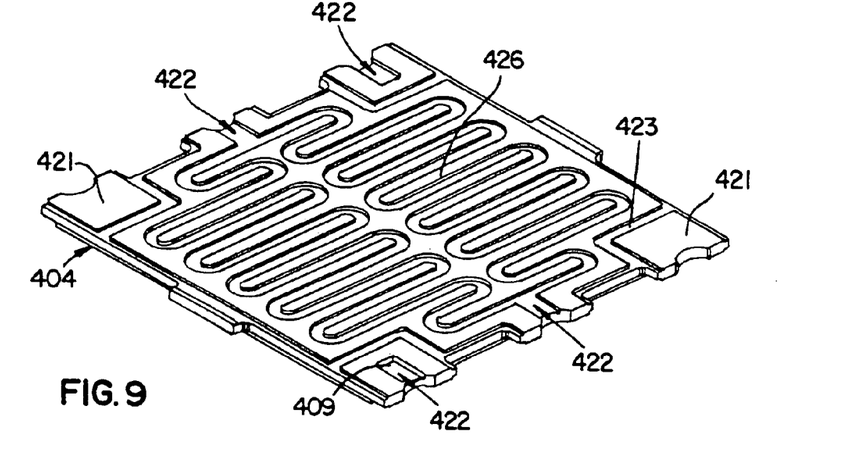
FIG. 9 is a perspective view of a portion of the bipolar plate assembly of FIG. 7, showing the coolant flow field, open channel, and opening into the coolant flow field, all defined in one surface of the separator plate.
Figure 10:
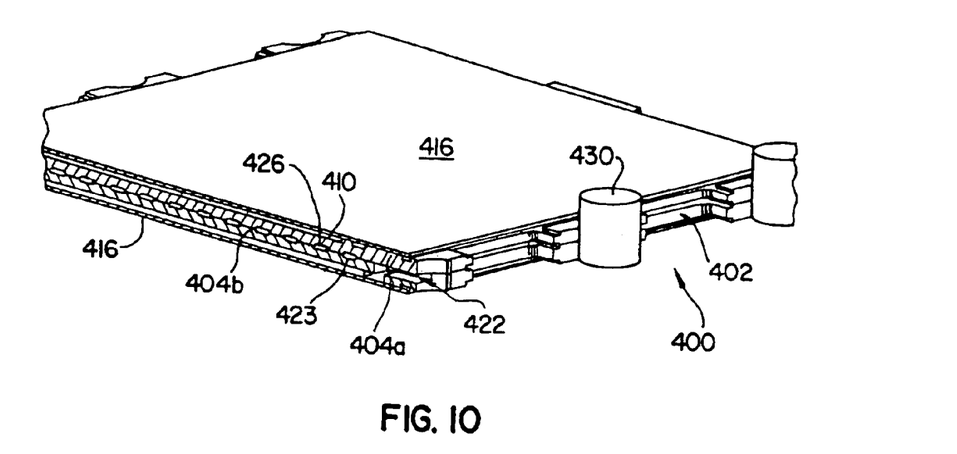
FIG. 10 is a perspective view of a portion of the fuel cell stack of FIG. 7, showing the membrane electrode assemblies in place on either side of a bipolar plate assembly, as well as plenum molding inserts covering some of the openings in preparation for encapsulating the fuel cell stack in a sealant material.

With reference now to FIG. 9, each plate body 409 has coolant flow field 426 defined on the face opposite of flow field 410. When two plate bodies 404 are joined, as shown in FIG. 10, coolant channels are formed by the joining of the two coolant flow fields 426. Coolant flow fields, and use of coolant in general, are optional. The invention can be suitably practiced without coolant fields, however, those skilled in the art will readily appreciate the advantages of controlling temperatures in fuel cell stack 400 by use of coolant channels. Various bonding methods may be selectively employed to join plate bodies 404, as long as the bonding agent and location also creates a sealed interface between the various areas of the plate in the plate-to-plate region. Alternately, the design allows for no plate bonding to be used, since all of the necessary seals may be created at the encapsulation step.

With continuing reference to FIG. 9, channels 422 can be seen. The channels 422 in opposite corners of plate body 404 as shown in FIG. 9 serve for ingress and egress of a reactant fluid to and from reactant flow field 410, shown in FIGS. 7-8. When two plate bodies 404 are mated to form a bipolar plate assembly 402, corner channels 422 in each plate are mated with flat channel surfaces 421 in the other plate. The channel 422 in the center (communicating with the coolant flow fields 426) of one plate body 404 mate with center channels 422 in the opposite plate body 404. Those skilled the art will readily appreciate that the channel configuration used in the center channels 422, namely wherein channels 422 are matched with each other across mated plates 404 rather than matched with flat surfaces 421, will also work in the corner channels (see e.g. channel 222 in FIG. 2), and vice versa, without departing from the spirit and scope of the invention.

With reference now to FIGS. 7 and 10, MEA 416 is disposed on each of plate bodies 404a and 404b. Each MEA 116 has a face that is in operable, fluid communication with a reactant flow field 410, as described above with reference to fuel cell stacks 100, 200, and 300.

For purposes of illustration and not limitation, as embodied herein and with reference to FIGS. 6-10, fuel cell stack 400 includes a reactant manifold in fluid communication with reactant flow field 410 through the opening 409 and channel 422. A layer of encapsulating material (for reference, see FIG. 6) is disposed about the separator plate, MEA, and reactant manifold. The reactant manifold is thus bounded at least in part by the encapsulating material.

The reactant manifold is designed to conduct fuels, oxidants, and coolants through fuel cell stack 400, as described above. The manifold can be made using features defined in the separator plates, such as openings 108, 208, and 308, etc., as described above. As depicted in FIG. 10, however, fuel cell stack 400 has a manifold that is formed largely of an encapsulating material molded around stack 400. Plenum molding inserts 430 are shown in FIG. 10 partially embraced by concavities in the edges of separator plate 402. Inserts 430 thereby block the openings into channels 422 in separator plate 402 for purposes of molding. After stack 400 is encased in encapsulating material, and after plenum molding inserts 430 are removed, a manifold will have been formed, as described in detail in co-pending U.S. patent application Ser. Nos. 11/784,941 and 11/786,082, each of which is incorporated by reference herein in its entirety.

Encapsulation channels 423 are shown surrounding corner channels 422 in FIG. 9. The ends of each encapsulation channel 423 reach edges of plate body 404. Channels 423 can be infused during the main molding process, or can be molded separately, to help seal reactant flow fields 410 from coolant flow fields 426 as described above. Channels 423 surround openings 409, however, it is also possible to practice the invention with channels 423 that only partially surround openings 409, or without channels 423 altogether, as long as the sealing function between openings 409 and flow field 426 is retained.

Another advantage of fuel cell stack 400 is that plate bodies 404 can all be substantially identical. Moreover, side-holes do not need to be drilled into the plates, because they are formed by the cooperation of channels/surfaces defined in the individual mated plate bodies, while cooling layers are provided at every cell. As with cell stacks 100, 200, and 300, the use of encapsulating material to seal and/or form part of the manifold allows for relaxed tolerances in plate bodies 404.

In accordance with another aspect of the invention, a method for making a fuel cell stack is provided. The method includes providing a bipolar plate assembly that has a first generally planar plate body having a first generally planar face defining a first reactant flow field. A second generally planar face defines a first opening through the plate to the first face and a first open channel in the second planar face extending from the opening toward a periphery of the plate. The first flow field, first opening and first open channel define a first fluid flow path. The method includes positioning a first MEA in operable communication with the first reactant flow field. The method further includes encapsulating the separator plate and MEA in a layer of encapsulating material. A reactant manifold is defined at least in part by the encapsulating material. The reactant manifold is adapted and configured to facilitate transport of a reactant through the fuel cell stack.

For purposes of illustration and not limitation, as embodied herein and as depicted in FIGS. 1-10, a first fuel cell bipolar plate assembly (e.g. 102, 202, 302, 402) is provided. The bipolar plate assembly includes a first generally planar plate body (e.g. 104, 204, 304, 404), which includes a first generally planar face (e.g. 106) defining a first reactant flow field (e.g. 110, 210, 310, 410). A second generally planar face (e.g. 113) defines a first opening (e.g. 108, 208, 308, and the net shape created by part 430 during the molding process) through the plate to the first face and a first open channel (e.g. 122, 222, 322, 422) in the second planar face extending from the opening toward a periphery of the plate. The first flow field, first opening, and first open channel define a first fluid flow path.

In further accordance with the method of the invention, an MEA (e.g. 116, 216, 316, 416) is positioned in operable communication with the first reactant flow field. With the MEA in place, the step of encapsulating the separator plate and MEA in a layer of encapsulating material (e.g. 220) is performed. At least a part of a reactant manifold (e.g. 118, 218) is defined by the encapsulating material. The manifold can be of the type described above with reference to stack 400 shown in FIG. 10, in which plenum inserts are used to keep encapsulating material from entering the channels during molding. It is also possible for the manifold to be of the type described above with reference to stacks 100, 200, and 300, in which the plates include most of the manifold features before being encased in encapsulating materials.

The methods and systems of the present invention, as described above and shown in the drawings, provide for a fuel cell stack with superior properties including ease of manufacture. Each and every document referred to herein is incorporated by reference in its entirety. It will be apparent to those skilled in the art that various modifications and variations can be made in the device and method of the present invention without departing from the spirit or scope of the invention. Thus, it is intended that the present invention include modifications and variations that are within the scope of the appended claims and their equivalents.

What is claimed is:

1. A fuel cell stack comprising:
   a) a bipolar plate assembly comprising a first generally planar plate body having:
      i) a first generally planar face comprising a first reactant flow field; and
      ii) a second generally planar face parallel to the first face defining a first opening that connects to a first open channel in the second planar face, wherein the first open channel extends from the first opening toward a periphery of the plate and entirely penetrates through the first generally planar plate body to connect with the first reactant flow field to define a first fluid flow path;
   b) a first membrane electrode assembly having a first face in operable communication with the first reactant flow field;
   c) a reactant manifold in fluid communication with the reactant flow field by way of the first fluid flow path, the reactant manifold being adapted and configured to facilitate transport of a reactant through the fuel cell stack; and
   d) a layer of encapsulating material disposed about the bipolar separator plate assembly, membrane electrode assembly and reactant manifold, wherein the reactant manifold is bounded and defined at least in part by the encapsulating material.

2. The fuel cell stack of claim 1, wherein the bipolar plate assembly further comprises a second generally planar plate body having:
   a) a third generally planar face; and
   b) a fourth generally planar face in intimate contact with the second face.

3. The fuel cell stack of claim 2, wherein:
   a) the third generally planar face defines a second reactant flow field; and
   b) the fourth generally planar face defines a second opening through the second plate and a second open channel in the fourth planar face extending from the opening toward a periphery of the second plate, wherein the second flow field, second opening and second open channel further cooperate to define a second fluid flow path.

4. The fuel cell stack of claim 3, further comprising a second membrane electrode assembly having a first face in operable communication with the second reactant flow field.

5. The fuel cell stack of claim 2, wherein the second and fourth faces cooperate to define a coolant flow field within the separator plate including a channel extending from the coolant flow field toward the periphery of the plate.

6. The fuel cell stack of claim 2, wherein the second and fourth faces cooperate to define at least one of (i) a reactant flow passage extending from a reactant flow field on at least one of the first and third planar face of the bipolar plate assembly toward a periphery of the bipolar plate assembly, and (ii) a coolant flow passage extending from a coolant flow field inside the bipolar plate assembly toward a periphery of the bipolar plate assembly.

7. The fuel cell stack of claim 6, wherein at least one of the flow passages terminates at an edge of the bipolar plate assembly at a port, the port having a perimeter defined at least in part by the second and fourth faces.

8. The fuel cell stack of claim 7, wherein the edge of the plate proximate the port defines a concavity for receiving a plenum mold insert.

9. The fuel cell stack of claim 1, wherein the second planar face defines a sealant channel therein that substantially surrounds the first opening and the first open channel.

10. The fuel cell stack of claim 9, wherein the sealant channel includes first and second ends proximate a periphery of the first plate body.

11. The fuel cell stack of claim 9, further comprising encapsulating material disposed in the sealing channel.

12. The fuel cell stack of claim 11, wherein the encapsulating material disposed in the sealing channel substantially fluidly isolates the reactant channel from the coolant channel.

13. The fuel cell stack of claim 2, wherein the first plate body and second plate body are an integral structure joined together at the second planar face and the fourth planar face.

14. The fuel cell stack of claim 13, wherein the first plate body and second plate bodies are joined by a conductive adhesive seal.

15. The fuel cell stack of claim 14, wherein the conductive adhesive seal is formed from a material selected from the group consisting of: (i) a resin material that is chemically compatible with material of the first plate body and the second plate body; and (ii) an adhesive material.

16. The fuel cell stack of claim 14, wherein the reactant manifold is internal.

17. A fuel cell stack comprising:
a) a bipolar plate assembly comprising a first generally planar plate body having:
  i) a first generally planar face comprising a first reactant flow field; and
  ii) a second generally planar face parallel to the first face defining a first opening that connects to a first open channel in the second planar face, wherein the first open channel extends from the first opening toward a periphery of the plate and entirely penetrates through the first generally planar plate body to connect with the first reactant flow field to define a first fluid flow path;
b) a first membrane electrode assembly having a first face in operable communication with the first reactant flow field;
c) a reactant manifold in fluid communication with the reactant flow field by way of the first fluid flow path, the reactant manifold being adapted and configured to facilitate transport of a reactant through the fuel cell stack; and
d) a layer of encapsulating material disposed about the bipolar plate assembly, membrane electrode assembly and reactant manifold, wherein the encapsulating material is bounded by the raised surfaces.

18. The fuel cell stack of claim 17, wherein the raised surface is an electrically insulating material.

19. The fuel cell stack of claim 17, wherein the raised surface is on both of the generally planar faces.

20. A fuel cell stack comprising:
a) a bipolar plate assembly comprising a first generally planar plate body having:
  i) a first generally planar face comprising a first reactant flow field; and
  ii) a second generally planar face parallel to the first face defining a first opening that connects to a first open channel in the second planar face, wherein the first open channel extends from the first opening toward a periphery of the plate and entirely penetrates through the first generally planar plate body to connect with the first reactant flow field to define a first fluid flow path;
b) a first membrane electrode assembly having a first face in operable communication with the first reactant flow field;
c) a layer of encapsulating material disposed about the bipolar plate assembly and the membrane electrode assembly, wherein the encapsulating material has a negative impression of a manifold insert; and
d) a reactant manifold in fluid communication with the reactant flow field by way of the first fluid flow path, the reactant manifold being adapted and configured to facilitate transport of a reactant through the fuel cell stack, wherein the reactant manifold is defined in part by the negative impression of the encapsulating material.

* * * * *

UNITED STATES PATENT AND TRADEMARK OFFICE
CERTIFICATE OF CORRECTION

| | | |
|---|---|---|
| PATENT NO. | : 8,124,292 B2 | Page 1 of 1 |
| APPLICATION NO. | : 11/823743 | |
| DATED | : February 28, 2012 | |
| INVENTOR(S) | : Thomas Vitella et al. | |

It is certified that error appears in the above-identified patent and that said Letters Patent is hereby corrected as shown below:

In the Claims:

At column 17, claim number 17, line number 40, please insert:

--iii) a raised surface on at least one of the generally planar faces and surrounding the first opening to form a flow obstruction;--

Signed and Sealed this
Seventeenth Day of July, 2012

David J. Kappos
*Director of the United States Patent and Trademark Office*